US009876790B2

(12) United States Patent
Jo et al.

(10) Patent No.: US 9,876,790 B2
(45) Date of Patent: Jan. 23, 2018

(54) SECRET DATA MATCHING DEVICE, COMPUTER-READABLE RECORDING MEDIUM STORING PROGRAM FOR UPDATING SECRET DATA, AND SECRET DATA UPDATING METHOD

(71) Applicant: FUJITSU LIMITED, Kawasaki-shi, Kanagawa (JP)

(72) Inventors: Yuka Jo, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/730,389

(22) Filed: Jun. 4, 2015

(65) Prior Publication Data
US 2015/0381616 A1 Dec. 31, 2015

(30) Foreign Application Priority Data

Jun. 27, 2014 (JP) ................................. 2014-133046

(51) Int. Cl.
*G06F 21/00* (2013.01)
*H04L 29/06* (2006.01)
(Continued)

(52) U.S. Cl.
CPC .......... *H04L 63/0861* (2013.01); *G06F 21/32* (2013.01); *G06F 21/60* (2013.01);
(Continued)

(58) Field of Classification Search
CPC ...... G06F 21/32; G06F 21/60; G06F 21/6218; G06K 9/00885; G06K 2009/00953; H04L 63/0861; H04L 9/3231; H04L 9/0891
See application file for complete search history.

(56) References Cited

U.S. PATENT DOCUMENTS 6,055,638 A * 4/2000 Pascal ..................... G06F 21/34
340/5.8
8,281,148 B2 10/2012 Tuyls et al.
(Continued)

FOREIGN PATENT DOCUMENTS

EP 2824602 A1 1/2015
JP 2009-129292 6/2009
(Continued)

OTHER PUBLICATIONS

Yuka Sugimura et al., "A proposal of key building technology using lattice masking", The Institute of Electronics, Information and Communication Engineers, Technical Report of IEICE, Section 3 to 4, Jul. 11, 2013, pp. 1-8.

(Continued)

*Primary Examiner* — Michael S McNally
*Assistant Examiner* — Amie C Lin
(74) *Attorney, Agent, or Firm* — Staas & Halsey LLP

(57) ABSTRACT

A secret data matching device includes a memory unit for storing a first secret vector obtained by concealing a first data set and a key data using a determination matrix; an obtaining unit for obtaining a second secret vector by concealing a second data set using the determination matrix; a calculating unit for calculating a residue vector which is a residue when the determination matrix is a modulus, from a difference between the first and second secret vectors; a determination unit for determining whether the first and second data sets are approximate based on the residue vector; an extracting unit for extracting the key data from the residue vector when the first data set and the second data set are approximate; a creating unit for generating a third secret vector by combining the key data and the second secret vector; and a storing unit for storing the third secret vector.

7 Claims, 10 Drawing Sheets

(51) Int. Cl.
| | |
|---|---|
| *G06F 21/60* | (2013.01) |
| *G06F 21/32* | (2013.01) |
| *G06F 21/62* | (2013.01) |
| *H04L 9/32* | (2006.01) |
| *H04L 9/08* | (2006.01) |

(52) U.S. Cl.
CPC ........ *G06F 21/6218* (2013.01); *H04L 9/0891* (2013.01); *H04L 9/3231* (2013.01)

(56) References Cited

U.S. PATENT DOCUMENTS

| | | | |
|---|---|---|---|
| 8,300,742 B1* | 10/2012 | Bromberg | H04L 25/0234 375/285 |
| 8,958,552 B2 | 2/2015 | Hattori et al. | |
| 2010/0040162 A1* | 2/2010 | Suehiro | H04L 25/0204 375/260 |
| 2011/0037563 A1 | 2/2011 | Choi et al. | |
| 2011/0185176 A1 | 7/2011 | Takahashi et al. | |
| 2012/0005736 A1 | 1/2012 | Takahashi et al. | |
| 2013/0014270 A1 | 1/2013 | Sy et al. | |
| 2013/0212645 A1 | 8/2013 | Takahashi | |
| 2013/0318351 A1* | 11/2013 | Hirano | H04L 9/3073 713/168 |
| 2014/0136094 A1 | 5/2014 | Yasuda et al. | |
| 2014/0325230 A1* | 10/2014 | Sy | G06F 21/32 713/171 |
| 2015/0186629 A1 | 7/2015 | Ishii | |

FOREIGN PATENT DOCUMENTS

| | | |
|---|---|---|
| JP | 2010-108365 | 5/2010 |
| JP | 2010-146245 | 7/2010 |
| JP | 2014-95878 | 5/2014 |
| WO | WO 2012/056582 A1 | 5/2012 |

OTHER PUBLICATIONS

Notice of Allowance mailed Jun. 22, 2016 in related U.S. Appl. No. 14/317,241.
Korean Office Action dated Aug. 18, 2015 in Korean Application No. 10-2014-0084388.
Extended European Search Report mailed Sep. 3, 2014 in European Application No. 14174932.5.
Belguechi, et al., "Operational bio-hash to preserve privacy of fingerprint minutiae templates", IET Biometrics 2013, vol. 2, Issue 2, p. 76-84.
Teoh, et al., "Cancellable biometrics and annotations on BioHash", Path Recognition 41, 2008, p. 2034-2044.
A.K. Jain, K. Nandakumar and A. Nagar, Biometric Template Security (Review Article), EURASIP Journal on Advance in Signal Processing, 99. 1-17, 2008.
A. Juels and M. Wattenberg, "A fuzzy commitment Scheme," in Proceedings of 6$^{th}$ ACM Conference on Computer and Communications Security (ACMCCS '99), pp. 28-36, 1999.
A. Juels and M. Sudan, "A fuzzy vault scheme," in Proceedings of the IEEE International Symposium on Information Theory, p. 408, 2002.
Office Action mailed Feb. 26, 2016 in U.S. Appl. No. 14/317,241.
U.S. Appl. No. 14/317,241, filed Jun. 27, 2014, Yuka Jo, Fujitsu Limited.
Extended European Search Report dated Oct. 30, 2015 in corresponding European Patent Application No. 15171160.3.
Rathgeb et al., "A survey on biometric cryptosystems and cancelable biometrics", EURASIP Journal on Information Security, 2011, pp. 1-25.
Lee et al., "Biometric Key Binding: Fuzzy Vault Based on Iris Images", ICB 2007, LNCS 4642, 2007, pp. 800-808.
Korean Office Action mailed May 2, 2016 in related Korean Application No. 10-2015-0086923.
Chinese Office Action dated Oct. 10, 2016 in corresponding Chinese Patent Application No. 201410323274.4.
Extended European Search Report dated Mar. 30, 2017 in European Application No. 16199076.7.
Yuka Sugimura et al., "A Biometric Key-Binding Scheme Using Lattice Masking", 2014 International Conference of the Biometrics Special Interest Group. Gesellschaft Für Informatik E.V.-GI), Sep. 10, 2014, pp. 1-4, XP032732032, ISBN: 978-3-88579-624-4.
U.S. Office Action dated May 18, 2017 from U.S. Appl. No. 15/353,208.
U.S. Notice of Allowance dated Sep. 20, 2017 from U.S. Appl. No. 15/353,208.
U.S. Appl. No. 15/353,208, filed Nov. 16, 2016, Yuka Jo, Fujitsu Limited.
Chinese Office Action dated Nov. 3, 2017 from Chinese Patent Application No. 201510345486.7, 22 pages.

* cited by examiner

FIG. 2

$$V = \begin{pmatrix} 20 & 0 & 0 & 7 & 5 \\ 0 & 10 & 0 & 4 & 3 \\ 0 & 0 & 14 & 5 & -2 \\ 0 & 0 & 0 & 20000 & -42 \\ 0 & 0 & 0 & 0 & 123 \end{pmatrix}$$

MATRIX FOR APPROXIMATE DETERMINATION

RANDOM NUMBER VECTOR

KEY THRESHOLD

SECRET DATA MATCHING DEVICE, COMPUTER-READABLE RECORDING MEDIUM STORING PROGRAM FOR UPDATING SECRET DATA, AND SECRET DATA UPDATING METHOD

CROSS-REFERENCE TO RELATED APPLICATION

This application is based upon and claims the benefit of priority of the prior Japanese Patent Application No. 2014-133046, filed on Jun. 27, 2014, the entire contents of which are incorporated herein by reference.

FIELD

The embodiments discussed herein are relate to a secret data matching device, a computer-readable recording medium storing program for updating secret data, and a secret data updating method.

BACKGROUND

Biometric authentication is a technique for enabling individual authentication using information about the physical characteristics and the behavioral characteristics of a human. Human physical characteristics include fingerprints, veins, irises, and the face for example. Behavioral characteristics include handwriting and gait for example. Biometric information called a template is obtained beforehand and authentication is carried out by comparing the obtained biometric information and information obtained by a sensor during matching.

Recently, a biometric authentication technique has been seen in which a template that has undergone some type of conversion is stored in a database and used in comparison without recovering, during the matching, the original template obtained. This biometric authentication technique is called "template protection-type biometric authentication". A system that uses this template protection-type biometric authentication technique does not permit the use of a leaked template and is able to inhibit access to a leaked template by changing the conversion method when a converted template has been leaked.

A template protecting method called key binding is known among the template protection-type biometric authentication techniques. The key binding method is a method for protecting a template and a key unique to a user by binding the template that indicates the biometric information and the key. When registering biometric information with the key binding method, the user inputs the biometric information and the user's unique key and a server registers the information, as a secure template in a database, in which the biometric information and the key are bound. When matching the biometric information, the user inputs the biometric information and the server matches the input biometric information and the secure template and extracts the user's unique key when the information and the secure template are near enough.

A technique in which the key binding method is achieved through lattice element adding is known as one technique for implementing the key binding method (see Yuka SUGIMURA, Masaya YASUDA, Shigefumi YAMADA, Narishige ABE, Takashi SHINZAKI, "A proposal of key binding technology using lattice masking", ISEC-IEICE Technical Report, Information and Communication system security, vol. 113, no. 135, pp. 297-304). With this technique, a secure template that differs according to each system may be created from the same biometric information and key and unconcealed biometric information does not have to be transmitted to the server during registration and during matching.

Another technique for implementing the key binding method is known that involves methods such as fuzzy commitment or fuzzy vault that make use of an error-correcting code technique. Fuzzy commitment and fuzzy vault are known to share a common portion of auxiliary information created from the template and the user's unique key for the same biometric information. Fuzzy commitment and fuzzy vault are known to involve transmitting unconcealed biometric information to the server during registration and during matching.

SUMMARY

According to an aspect of the invention, a secret data matching device includes a memory unit configured to store a first secret vector obtained by concealing a first data set and a key data using a first linear combination and a first random number, the first linear combination being composed of row vectors in a determination matrix which is generated by attaching a random number vector as a last column to a matrix, the matrix including diagonal elements of a threshold for determining whether two sets of data are approximate and a threshold related to the key data; an obtaining unit configured to obtain a second secret vector obtained by concealing a second data set using a second linear combination of the row vectors of the determination matrix and a second random number; a calculating unit configured to calculate a residue vector which is a residue when the determination matrix is a modulus, from a difference between the first secret vector stored in the memory unit and the second secret vector obtained by the obtaining unit; a determination unit configured to determine whether the first data set and the second data set are approximate based on the residue vector calculated by the calculating unit; an extracting unit configured to extract the key data from the residue vector when the first data set and the second data set are determined as approximate as a result of the determination by the determination unit; a creating unit configured to generate a third secret vector by adding the key data extracted by the extracting unit to the second secret vector obtained by the obtaining unit; and a storing unit configured to store the third secret vector created by the creating unit in the memory unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of an approximate determination matrix;

DESCRIPTION OF EMBODIMENTS

Biometric information proper to an individual and with few changes in the characteristics is selected as the biometric information to be used for biometric authentication. However, in general, the level of similarity between the biometric information used during the matching and the template registered at first gradually decreases over time. This decrease occurs due to long-term changes of the physical characteristics and the behavioral characteristics. This decrease may also occur due to operation habituation on the device used for obtaining the physical characteristics or the behavioral characteristics during matching. In order not to decrease similarity in the level, the template is updated at fixed periods or in response to indications of a decrease in the level of similarity. Methods for updating the template include a method for repeating the procedure used during first registration.

However, there is a problem in that the biometric information is not be updated securely or easily in the conventional techniques for implementing the key binding method.

For example, when conducting the method for repeating the procedure used in the first registration, the server is unable to easily update the biometric information because the user proceeds to a location dedicated to registering the biometric information and repeats the procedures for obtaining the biometric information at a fixed period or whenever there is an indication that the level of similarity has decreased.

Fuzzy commitment and fuzzy vault involve transmitting unconcealed biometric information to the server during registration and thus the server is unable to update the biometric information securely.

Although unconcealed biometric information is not transmitted to the server during registration or matching in the key binding method using lattice element adding, the server is unable to update the biometric information easily because the procedures from the first registration are repeated.

The above problem is not limited to updating biometric information and the same problem occurs when updating numerical information such as position information or confidential information.

Accordingly, it is desired to securely and easily update biometric information with the key binding method with respect to the template protection-type biometric authentication technique.

Hereinafter follows an explanation of embodiments of a secret data matching device, a secret data updating program, and a secret data updating method disclosed herein with reference to the drawings. The secret data matching device uses the key binding method among the template protection-type biometric authentication techniques. The present disclosure is not limited by the embodiments disclosed herein.

(First Embodiment)

(Configuration of Secret Data Matching System)

Figure 1:
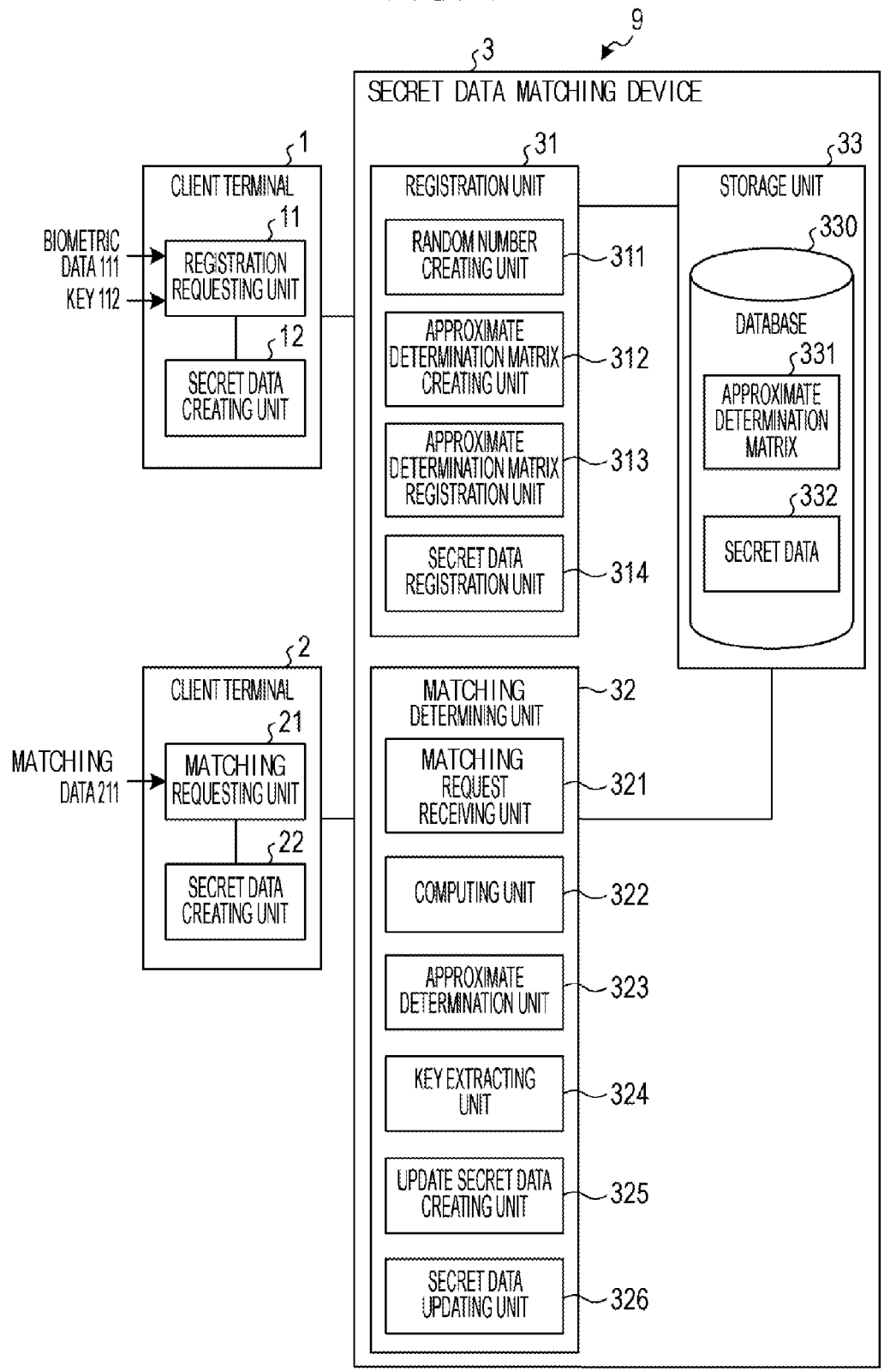
FIG. 1 is a view for explaining an example of a functional configuration of a secret data matching system according to a first embodiment.

FIG. 1 is a view for explaining an example of a functional configuration of a secret data matching system according to a first embodiment. As illustrated in FIG. 1, a secret data matching system 9 includes client terminals 1, 2 and a secret data matching device 3. A database 330 is included in the secret data matching device 3. The secret data matching device 3 and the client terminals 1 and 2 are connected over a network.

The secret data matching system 9 conceals a client's biometric data and a client's characteristic key data based on special random numbers (lattice element) called lattice masking and registers in the database 330 first secret data which is obtained by the concealing. When the client requests the matching of the biometric data, the secret data matching system 9 conceals the biometric data to be matched based on a different lattice element to obtain second secret data. The secret data matching system 9 determines whether the biometric data corresponding to the first secret data and the biometric data corresponding to the second secret data are approximate by applying a mapping specific to lattice theory to a difference between the first secret data and the second secret data. When the both biometric data are determined to be approximate, the secret data matching system 9 extracts the key data from the first secret data and creates third secret data by adding together the extracted key data and the second secret data used during authentication. The secret data matching system 9 then registers the created third secret data in the database 330 in place of the first secret data. That is, the secret data matching system 9 conceals the biometric information of a client requested to be matched to obtain secret data, and updates and registers the first secret data using the obtained secret data. For ease of explanation in the embodiment, the client terminal 1 represents the terminal of the client registering the biometric data, and the client terminal 2 represents the terminal requesting the matching of the biometric data. The client terminal 1 may be present as a plurality of terminals. The client terminal 2 may be present as a plurality of terminals.

Details of updating the secret data in which the biometric data of the client and the key data unique to the client are concealed in the secret data matching system 9 will be explained hereinbelow.

The client terminal 1 includes a registration requesting unit 11 and a secret data creating unit 12. A key 112 is represented by numerical values for example in the embodiments.

The registration requesting unit 11 issues a request to the secret data matching device 3 to register biometric data 111 and the key 112. For example, the registration requesting unit 11 receives the biometric data 111 and the key 112 from an external terminal. The registration requesting unit 11 then issues a request to the secret data matching device 3 for registration of the received biometric data 111 and the key 112. The external terminal may be a terminal coupled over the network.

The biometric data 111 is data of the physical characteristics or the behavioral characteristics of the client. Fingerprints, veins, irises, and the face are examples of physical characteristic data. Handwriting and gait are examples of behavioral characteristic data. In the embodiment, the biometric data 111 is represented by a vector having components of the n-dimension. The key 112 is key data that the client desires to register with the biometric data. A key 112 is represented by numerical values for example in the embodiments.

The registration requesting unit 11 receives from the secret data matching device 3 a linear combination (lattice element) corresponding to an approximate determination matrix 331 described below as a response to the registration request, and outputs the received lattice element to the secret data creating unit 12. The registration requesting unit 11 receives, from the secret data creating unit 12, the secret data in which the biometric data 111 and the key 112 are concealed and issues a request to the secret data matching device 3 to register the secret data.

The secret data creating unit 12 creates secret data in which the biometric data 111 and the key 112 are concealed.

For example, the secret data creating unit 12 creates a (n+2)-dimensional vector in which "0" is attached as the last component of the combination data of the biometric data 111 and the key 112 with regard to the biometric data 111 and the key 112. That is, the secret data creating unit 12 creates the (n+2)-dimensional vector by attaching a one dimensional component of the key 112 and "0" as a (n+2)nd component to the n-dimensional component of the biometric data 111. As an example, T is assumed to indicate the n-dimensional component of the biometric data 111 and K is assumed to indicate the one dimensional component of the key 112. As a result, the secret data creating unit 12 creates (T, K, 0) as the (n+2)-dimensional vector.

Obtaining the linear combination (lattice element) from the registration requesting unit 11, the secret data creating unit 12 creates a random number. The secret data creating unit 12 creates a secret vector in which the created (n+2)-dimensional vector is added to the product of the linear combination (lattice element) and the random number. As an example, when the random number is $r_1$ and the lattice element is $b_1$, the secret vector is represented by (T, K, 0)+$r_1 \times b_1$. The secret data creating unit 12 then outputs the created secret vector to the registration requesting unit 11 as the secret data.

The client terminal 2 includes a matching requesting unit 21 and a secret data creating unit 22.

The matching requesting unit 21 issues a request to the secret data matching device 3 to match the biometric data. The biometric data to be matched is matching data 211. In the embodiments, the matching data 211 is represented by a vector having an n-dimensional component. The matching requesting unit 21 receives from the secret data matching device 3 the linear combination (lattice element) corresponding to the approximate determination matrix 331 described below as a response to the matching request, and outputs the received lattice element to the secret data creating unit 22. Receiving the secret data in which the biometric data 211 is concealed from the secret data creating unit 22, the matching requesting unit 21 issues a request to the secret data matching device 3 to match the secret data. The lattice element received from the secret data matching device 3 is different from the lattice element received by the registration requesting unit 11 in the client terminal 1 during registration.

The secret data creating unit 22 creates the secret data in which the biometric data 211 is concealed.

For example, the secret data creating unit 22 creates an (n+2)-dimensional vector in which "0" is attached as the last component and as the component before the last component in the matching data 211. That is, the secret data creating unit 22 creates an (n+2)-dimensional vector in which "0" is attached to the n-dimension component of the matching data 211 as the (n+1)st component and the (n+2)nd component. As an example, the matching data 211 is assumed to be Q which indicates the n-dimensional component. As a result, the secret data creating unit 22 creates (Q, 0, 0) as the (n+2)-dimensional vector.

The secret data creating unit 22 obtains the linear combination (lattice element) from the matching requesting unit 21 to create a random number. The secret data creating unit 22 then creates a secret vector as a secret data by adding the created (n+2)-dimensional vector to the product of the linear combination (lattice element) and the random number. As an example, when the random number is $r_2$ and the lattice element is $b_2$, the secret vector would be represented as (Q, 0, 0)+$r_2 \times b_2$. The secret data creating unit 22 then outputs the created secret vector to the matching requesting unit 21 as the secret data. While the method for creating the random number may involve the use of any method, the various parameters are preferably different so that the random numbers created for the client terminals 1 and 2 are not the same.

The secret data matching device 3 includes a registration unit 31, an matching determining unit 32, and a storage unit 33. The registration unit 31 creates the belowmentioned approximate determination matrix 331 and registers the created approximate determination matrix in the database 330 of the storage unit 33. The registration unit 31 registers the secret data subject to the registration request in the database 330 of the storage unit 33. The matching determining unit 32 matches the secret data in which the matching data subject to the matching request is concealed and the registered secret data to determine whether the data are approximate or not. When it is determined that the data are approximate, the matching determining unit 32 uses the secret data in which the matching data subject to the matching request is concealed to update the previously registered secret data.

The storage unit 33 is a storage device such as a hard disk or an optical disk. The storage unit 33 may be a semiconductor memory that allows data to be rewritten such as a random access memory (RAM), a read-only memory (ROM), a flash memory, a non-volatile static random access memory (NVSRAM).

The storage unit 33 stores the database 330. The approximate determination matrix 331 and secret data 332 are stored in the database 330. A single piece of the secret data 332 is stored for each user. The approximate determination matrix 331 is registered by the registration unit 31 as described below. The secret data 332 is registered by the registration unit 31 as described below and is updated by the matching determining unit 32 as described below. Details of the approximate determination matrix 331 are described below.

The registration unit 31 includes a random number creating unit 311, an approximate determination matrix creating unit 312, an approximate determination matrix registration unit 313, and a secret data registration unit 314.

The random number creating unit 311 creates random numbers to be used for creating the approximate determination matrix 331 and outputs the created random numbers to the approximate determination matrix creating unit 312. The random numbers used for creating the approximate determination matrix 331 are a random numbers that are attached respectively as the last column and the next to the final column of a square matrix which indicates a threshold set of an approximation range when creating the approximate determination matrix 331. The threshold set of the approximation range is a numerical value set indicated by the client as the approximation range and each value in the threshold set represents information which represents length of each of the dimensional directions as vectors of the approximation range. For example, when the threshold set of the approximation range is "e, f, g," the random number creating unit 311 creates random numbers "h, i, j" that satisfy e/2≥h, f/2≥i, and g/2≥j and optional random numbers "k, l".

The approximate determination matrix creating unit 312 creates the approximate determination matrix 331 for performing the approximation determination. The created approximate determination matrix 331 is created in such a way so as to be different for each system that contains a secret data matching device 3.

For example, the approximate determination matrix creating unit 312 creates a diagonal matrix in which values in the threshold set indicating the approximation range are set as diagonal components and the other components are set as "0". As an example, when the biometric data subject to the determination is information having an n number of components, that is, when the biometric data 111 is the n-dimensional information, the approximate determination matrix creating unit 312 creates the diagonal matrix of n×n. The approximate determination matrix creating unit 312 then sets a threshold of the key 112 to an element of the (n+1) row and the (n+1) column. The threshold of the key 112 is information that indicates the allowable maximum value of the key set by the client.

The approximate determination matrix creating unit 312 creates a (n+2)×n matrix in which the next to last row and the last row in which all the elements are "0" are attached to the created n×n diagonal matrix. The approximate determination matrix creating unit 312 creates a random number vector having the number of components equal to n (number of rows in the diagonal matrix). The approximate determination matrix creating unit 312 creates a random number vector having the number of components which is equal to 2+the n number of columns of the diagonal matrix as the final row number. The random numbers created by the random number creating unit 311 are set as the components of the random number vector. The secret data matching device 3 creates a (n+2)×(n+2) square matrix in which the random number vector is attached as the approximate determination matrix 331.

The approximate determination matrix registration unit 313 registers the approximate determination matrix 331 created by the approximate determination matrix creating unit 312 in the database 330.

The approximate determination matrix 331 is explained with reference to FIG. 2. FIG. 2 illustrates an example of an approximate determination matrix. An example in which the biometric data and the approximation range are expressed with 3-dimensional numerical values will be explained in the example in FIG. 2. As illustrated in FIG. 2, an approximate determination matrix V corresponding to the approximate determination matrix 331 is a matrix in which a key threshold and random number vectors are added to a matrix for approximate determination in the range indicated by the dotted line.

The matrix for approximate determination has thresholds, as diagonal elements, for specifying the lengths as the vectors in the dimensional directions of the approximation range. In the example in FIG. 2, the length as the vector in the X-axis direction of the approximation range is "20", the length as the vector in the Y-axis direction is "10", and the length as the vector in the Z-axis direction is "14". That is, the matrix for approximate determination illustrated in FIG. 2 is a matrix for determining whether the two sets of biometric data are included in the range of "±10" in the X-axis direction, "±5" in the Y-axis direction, and "±7" in the Z-axis direction.

"0, 0, 0" are attached to the fourth row for key padding. Moreover, "7, 4, 5, 20000" are attached to the fourth column as a combination of the random number vectors "7, 4, 5" and the key threshold "20000". "0, 0, 0, 0" are attached to the fifth row which is the last row. The random number vectors "5, 3, −2, −42, 123" are attached to the fifth column which is the last column. While the approximation range is specified with 3-dimensional numerical values in the example in FIG. 2, the embodiment is not limited in this way and numerical values of any dimension may be used.

Returning to FIG. 1, the secret data registration unit 314 registers the secret data in the database 330. The registered secret data corresponds to the template to be protected in the key binding method.

For example, when a request for registration is received form the client terminal 1, the secret data registration unit 314 creates random numbers for the linear combination corresponding to the approximate determination matrix 331. As an example, the secret data registration unit 314 obtains the row vectors $v_1, v_2, \ldots, v_{n+2}$ each of which has the n+2 number of components corresponding to the approximate determination matrix 331. The secret data registration unit 314 then selects suitable integers $d_1, d_2, \ldots, d_{n+2}$ for the respective row vectors $v_1, v_2, \ldots, v_{n+2}$. The secret data registration unit 314 calculates n+2-dimensional vectors expressed by the sum of the products of the row vectors and the integers, that is by $d_1 \times v_1 + d_2 \times v_2 + \ldots + d_{n+2} \times v_{n+2}$, as the linear combination. This linear combination is the "lattice element". The secret data registration unit 314 selects different sets of the integers $d_1, d_2, \ldots, d_{n+2}$ for each set of biometric data to calculate the linear combination which is the sum of the products of the selected sets of the integers and the row vectors of the approximate determination matrix 331.

The secret data registration unit 314 further delivers the calculated linear combination, that is the lattice element, to the client terminal 1 as the response to the registration request. When the registration request for the secret data 332 is received from the client terminal 1, the secret data registration unit 314 registers the secret data 332 subject to the registration request in the database 330.

The matching determining unit 32 includes a matching request receiving unit 321, a computing unit 322, an approximate determination unit 323, a key extracting unit 324, an update secret data creating unit 325, and a secret data updating unit 326.

Upon receiving a matching request from the client terminal 2, the matching request receiving unit 321 creates random numbers (lattice element) for the linear combination corresponding to the approximate determination matrix 331. The creation of the random numbers for the linear combination is carried out in the same way as by the secret data registration unit 314 and therefore an explanation will be omitted. The lattice element created by the matching request receiving unit 321 is created so as to be different from the lattice element created by the secret data registration unit 314 during registration.

The matching request receiving unit 321 delivers the calculated linear combination, that is the lattice element, to the client terminal 2 as a response to the matching request. When a request is issued from the client terminal 2 for matching of the secret data in which the matching data 211 is concealed, the matching request receiving unit 321 outputs the secret data subject to the matching request to the computing unit 322.

The computing unit 322 calculates a difference vector indicating the difference between the secret data 332 (secret vector) registered in the database 330 and the secret data in which the matching data 211 is concealed received from the client terminal 2. The computing unit 322 then calculates the calculated difference vector to obtain a residue vector as the residue when the approximate determination matrix 331 is used as the modulus. As an example, when the difference vector is z and the approximate determination matrix 331 is V, the residue vector is expressed as "z mod V". "z mod V" is equivalent to $(z-[z \times V^{-1}] \times V)$. "$V^{-1}$" represents the inverse matrix of the matrix V. "$[z \times V^{-1}]$" represents a vector rounded to the nearest integer with respect to each dimension of the vector "$z \times V^{-1}$". The computing unit 322 outputs the calculated residue vector to the approximate determination unit 323.

When the last component of the residue vector is found to be "0" when determining whether the last component of the residue vector received from the computing unit 322 is "0" or not, the approximate determination unit 323 determines that the biometric data 111 of the registration side and the matching data 211 are approximate. When the last component of the residue vector is not "0", the approximate determination unit 323 determines that the biometric data 111 of the registration side and the matching data 211 are not approximate.

When the biometric data 111 and the matching data 211 are determined as approximate, the key extracting unit 324 extracts the (n+1)st component in the residue vector as the key 112 unique to the user. The key extracting unit 324 then transmits the extracted key 112 to the client terminal that has requested the matching. When the biometric data 111 and the matching data 211 are determined not to be similar to each other, the key extracting unit 324 transmits the fact that the data are not approximate to the client terminal 2, that is, the fact that the identification failed.

When the data is determined to be approximate, the update secret data creating unit 325 adds the key 112 extracted by the key extracting unit 324 to the secret data subject to the matching request to create secret data for updating. For example, the update secret data creating unit 325 adds n number of 0's and one 0 to the key 112 extracted by the key extracting unit 324 to create an expanded key vector (0, K, 0). The first 0 in the key vector represents the n-dimensional zero vector and the last 0 is a scalar. The update secret data creating unit 325 adds the key vector to the secret data subject to the matching request to create update secret data.

The secret data updating unit 326 stores the update secret data created by the update secret data creating unit 325 in the database 330. That is, the secret data updating unit 326 registers the update secret data in the database 330 in place of the secret data 332.

(Theory of Approximate Determination)

The theory of approximate determination executed by the matching determining unit 32 will be explained first. The approximate determination matrix 331 will be explained as approximate determination matrix V. The linear combination of $v_1, v_2, \ldots, v_{n+2}$ each of which is a row vector in the approximate determination matrix V may be represented by a set L (lattice L) which has elements in a form of the linear combination $d_1 \times v_1 + d_2 \times v_2 + \ldots + d_{n+2} \times v_{n+2}$ of each row vector in the approximate determination matrix V. That is, the linear combination of the row vectors in the approximate determination matrix V correspond to any of the intersections on the lattice composed of the elements of the set L.

A secret vector H in which the dimensional biometric data T and a key K are concealed is expressed with the following formula (1) using the lattice element $b_1$ of the set L and a random number $r_1$. (T, K, 0) is the (n+2)-dimensional vector in which the key K and "0" as the (n+2)nd component are added to the biometric data T.

$$H=(T,K,0)+r_1 \times b_1 \qquad (1)$$

The secret vector H is created by the secret data creating unit 12 in the client terminal 1. The created secret vector H is registered by the registration requesting unit 11 in the database 330.

A secret vector H' in which n-dimensional matching data Q is concealed is expressed with the following formula (2) using the lattice element $b_2$ of the set L and a random number $r_2$. (Q, 0, 0) is the (n+2)-dimensional vector in which "0" as the (n+1)st component and the (n+2)nd component are added to the matching data Q. $b_2$ and $b_1$ are different.

$$H'=(Q,0,0)+r_2 \times b_2 \qquad (2)$$

The secret vector H' is created by the secret data creating unit 22 in the client terminal 2. The created secret vector H' is transmitted by the matching requesting unit 21 to the secret data matching device 3.

In this case, a difference vector z between the secret vectors H and H' is expressed by the following formula (3).

$$z=H-H'=(T-Q,K,0)+r_1 \times b_1 - r_2 \times b_2 \qquad (3)$$

Because the "$r_1 \times b_1 - r_2 \times b_2$" in the difference vector z is the difference between the products each of which is product of the element of the set L and the random number, the "$r_1 \times b_1 - r_2 \times b_2$" is included in the elements of the set L. That is, $r_1 \times b_1 - r_2 \times b_2$ corresponds to any of the intersections on the lattice composed of the elements of the set L. When the residue vector of the approximate determination matrix V is calculated from the difference vector z, "z mod V" corresponds to mapping the difference vector z on a fundamental domain P (L) defined by the set L. As a result, when the residue vector of the approximate determination matrix V is calculated from the difference vector z, $r_1 \times b_1 - r_2 \times b_2$ may be ignored. Accordingly, when "z mod V" is calculated, the lattice portion including portions of the difference vector z other than the end in the difference vector z may be ignored and only one lattice including the end of the difference vector z is mapped on the fundamental domain P (L). That is, "z mod V" is expressed by the following formula (4).

$$z \bmod V=(T-Q,K,0) \bmod V \qquad (4)$$

When the vector (T−Q, K, 0) is included in the fundamental domain P (L), that is when the biometric data T and the matching data Q are approximate, z mod V=(T−Q, K, 0). As a result, the last component of "z mod V" has a very high probability of being "0" when the biometric data T and the matching data Q are approximate.

When the vector (T−Q, K, 0) is not included in the fundamental domain P (L), that is when the biometric data T and the matching data Q are not approximate, z mod V=(T−Q, K, 0)+b when an element of the lattice belonging to the set L is b. As a result, the last component of "z mod V" has a very high probability of being a number other than "0" when the biometric data T and the matching data Q are not approximate.

According to the theory of approximate determination, the matching determining unit 32 calculates the residue vector of the approximate determination matrix V from the difference between the secret vectors H and H', and performs the approximate determination of the concealed biometric data based on the last component of the calculated residue vector. The matching determining unit 32 then extracts the key K from the secret vector H when the data is determined as approximate based on a result of the approximate determination. The matching determining unit 32 outputs the extracted key K to the client terminal that has requested the matching.

(Theory of Processing for Creating the Update Secret Data)

Next, the theory of the creation of the update secret data executed by the matching determining unit 32 will be explained. When the biometric data T and the matching data Q are approximate, the secret data matching device 3 has the key K unique to the user and the secret vector H' (=(Q, 0, 0)+$r_2 \times b_2$) see formula (2)) in which the n-dimensional matching data is concealed. The matching determining unit 32 creates the (n+2)-dimensional key vector (0, K, 0) using the key K. The first 0 in the key vector represents the n-dimensional zero-vector (having the same data structure as the biometric data) and the last 0 is a scalar.

The matching determining unit 32 creates update secret data $H_1$ using the following formula (5) from the secret vector H' and the key vector.

$$H_1 = H' + (0, K, 0) \quad (5)$$

The following equation (6) is obtained when the above equation (5) is transformed.

$$H_1 = \{(Q, 0, 0) + r_2 \times b_2\} + (0, K, 0) = (Q, K, 0) + r_2 \times b_2 \quad (6)$$

The Q, $r_2$, and $b_2$ in formula (6) represent the matching data 211, a random number, and the lattice element, respectively. The secret vector H (=(T, K, 0)+$r_1 \times b_1$) expressed in formula (1) is compared here with the secret vector $H_1$ (=(Q, K, 0)+$r_2 \times b_2$) expressed in formula (6). It may be seen that the secret vector $H_1$ is a secret vector created from Q which is the matching data 211 and from the key K unique to the user. Consequently, the update of the template in the key binding method may be performed by registering the secret vector $H_1$ as the secret data in place of the secret vector H in the database 330. That is, the matching determining unit 32 registers the secret data of the matching data Q in place of the previously registered secret data 332 in the database 330.

(Sequence of Registration Processing for Secret Data)

Figure 3:
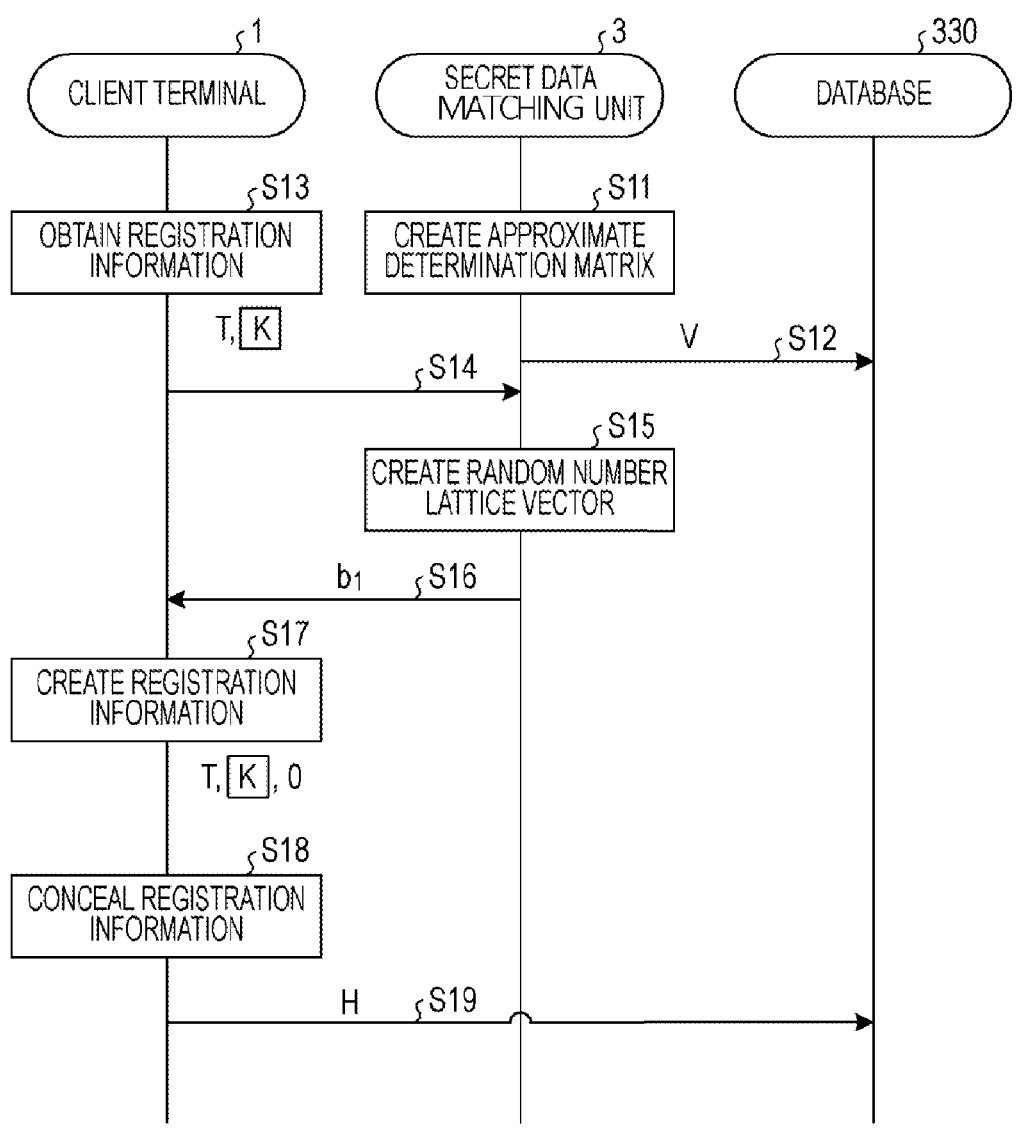
FIG. 3 illustrates a sequence of secret data registration processing.

Next, a sequence of the registration processing for the secret data will be explained with reference to FIG. 3. FIG. 3 illustrates a sequence of secret data registration processing. The biometric data 111 of the client is represented as T, the key 112 unique to the client is represented as K, the approximate determination matrix 331 is represented as V, and the secret vector is represented as H in FIG. 3.

The approximate determination matrix creating unit 312 in the secret data matching device 3 creates the approximate determination matrix V (step S11). The approximate determination matrix registration unit 313 then registers the created approximate determination matrix V in the database 330 (step S12).

The registration requesting unit 11 in the client terminal 1 obtains the registration information (step S13). The registration requesting unit 11 obtains the biometric data T and the key K as the registration information. The registration requesting unit 11 then issues a request to the secret data matching device 3 to register the biometric data T and the key K (step S14).

The secret data registration unit 314 that receives the registration request from the client terminal 1 in the secret data matching device 3 creates a random number lattice vector (step S15). The secret data registration unit 314 calculates the linear combination which is expressed by the sum of the products of the row vectors in the approximate determination matrix V and the appropriate integers. The calculated linear combination is the random number lattice vector $b_1$ and is the lattice element. The secret data registration unit 314 then transmits the calculated random number lattice vector (lattice element) $b_1$ to the client terminal 1 (step S16).

The secret data creating unit 12 in the client terminal 1 creates the registration information (step S17). The secret data creating unit 12 creates the vector (T, K, 0) in which "0" is added to the combined data (T, K) of the biometric data T and the key K.

The secret data creating unit 12 then conceals the registration information (step S18). The secret data creating unit 12 creates the secret vector H in which the created vector (T, K, 0) is added to the product of the random number lattice vector (lattice element) $b_1$ and the random number. When the random number is $r_1$, the secret vector H is expressed by (T, K, 0)+$r_1 \times b_1$.

The registration requesting unit 11 transmits to the secret data matching device 3 the secret vector H in order to request the registration of the secret vector H which is the registration information concealed by the secret data creating unit 12 (step S19). As a result, the secret vector H is registered in the database 330 of the secret data matching device 3.

(Sequence of Updating Processing for Secret Data)

Figure 4:
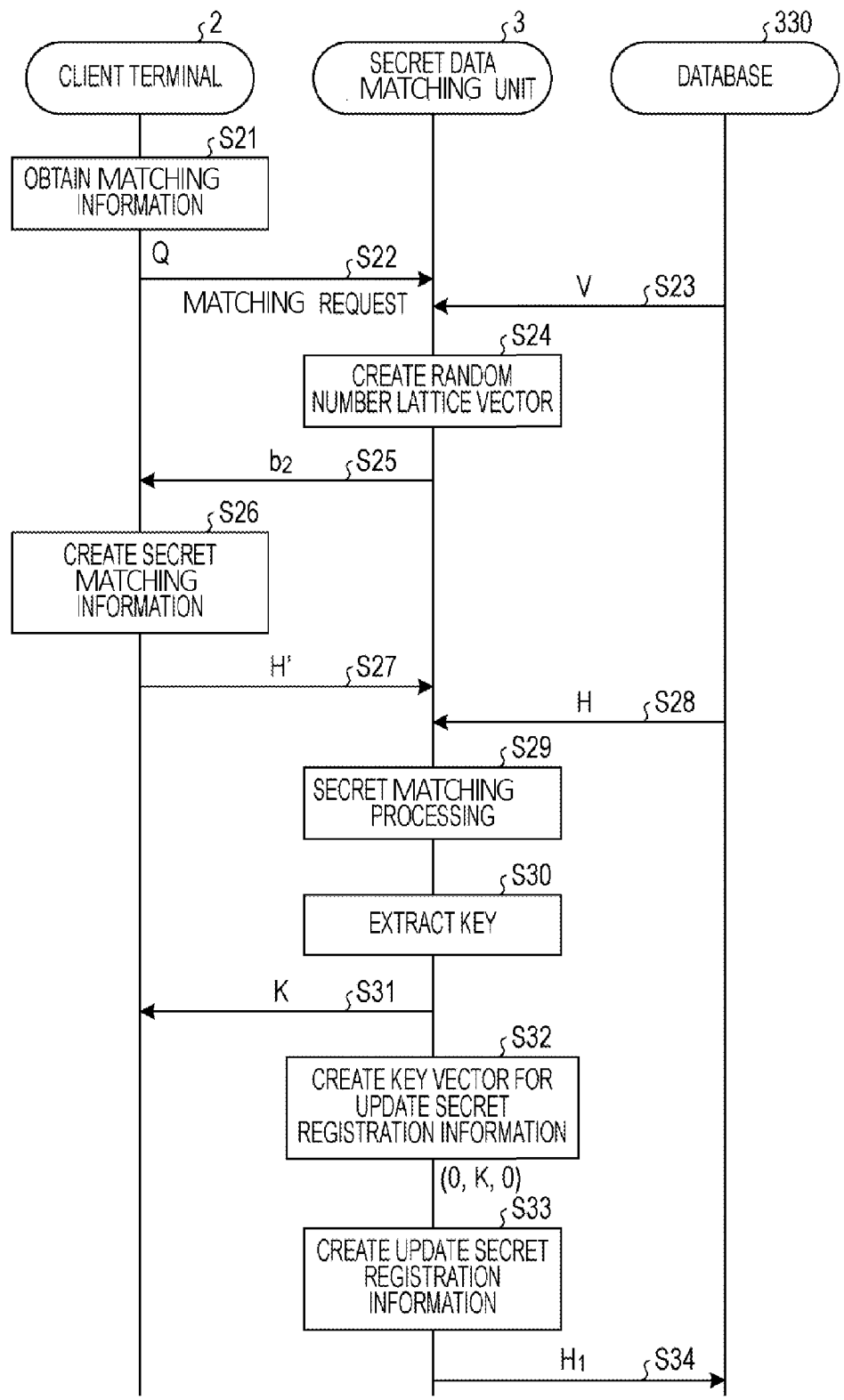
FIG. 4 illustrates a sequence of secret data updating processing according to the first embodiment.

Next, a sequence of the updating processing for the secret data will be explained with reference to FIG. 4. FIG. 4 illustrates a sequence of secret data updating processing according to the first embodiment. The matching data 211 of the client is represented as Q, the key 112 unique to the client is represented as K, the approximate determination matrix 331 is represented as V, and the secret vector is represented as H and H' in FIG. 4.

The matching requesting unit 21 in the client terminal 2 obtains the matching information (step S21). The matching requesting unit 21 obtains the matching data Q as the matching information. The matching requesting unit 21 then issues a request to the secret data matching device 3 for matching of the matching data Q (step S22).

The matching request receiving unit 321 in the secret data matching device 3 that received the matching request from the client terminal 2 obtains the approximate determination matrix V from the database 330 (step S23). The matching request receiving unit 321 creates the random number lattice vector (step S24). The matching request receiving unit 321 calculates the linear combination that is expressed by the sum of the products of the appropriate integers and the row vectors of the read approximate determination matrix V. The calculated linear combination is the random number lattice vector $b_2$ and is the lattice element. The matching request receiving unit 321 then transmits the calculated random number lattice vector (lattice element) $b_2$ to the client terminal 2 (step S25). $b_2$ and $b_1$ are different.

The secret data creating unit 22 in the client terminal 2 creates the secret matching information (step S26). The secret data creating unit 22 creates the vector (Q, 0, 0) in which two "0"'s are added to the matching data Q. The secret data creating unit 22 creates the secret vector H' in which the created vector (Q, 0, 0) is added to the product of the random number lattice vector (lattice element) $b_2$ and the random number. When the random number is $r_2$, the secret vector H' would be represented as $(Q, 0, 0)+r_2 \times b_2$. The matching requesting unit 21 then transmits the secret vector H' to the secret data matching device 3 in order to request the matching of the secret vector H' (step S27)

The computing unit 322 in the secret data matching device 3 obtains the secret vector H from the database 330 (step S28). The approximate determination unit 323 then uses the residue vector calculated from the difference vector of the secret vector H' for which matching is requested and the obtained secret vector H to perform the matching processing while the vectors T and Q are still concealed (step S29). The approximate determination unit 323 determines whether the last component of the residue vector is "0". When the last component of the residue vector is "0", the approximate determination unit 323 determines that the biometric data T that is the source of the registration and the matching data Q are approximate. When the last component of the residue vector is not "0", the approximate determination unit 323 determines that the biometric data T that is the source of the registration and the matching data Q are not approximate.

When the data is determined to be approximate, the key extracting unit 324 extracts the key K unique to the user from the residue vector (step S30). The key extracting unit 324 then transmits the extracted key K to the client terminal 2 that requested the matching (step S31).

The update secret data creating unit 325 then creates the key vector for the update secret registration information from the key K extracted by the key extracting unit 324 (step S32). The update secret data creating unit 325 attaches n number of 0's and one 0 to the key K to create an expanded key vector (0, K, 0).

The update secret data creating unit 325 then creates the update secret registration information (step S33). The update secret data creating unit 325 adds the key vector (0, K, 0) and the secret vector H' subject to the matching request to create the update secret vector $H_1$ as the update secret registration information.

The secret data updating unit 326 transmits the update secret registration information created by the update secret data creating unit 325 to the database 330 (step S34). The secret data updating unit 326 discards the protected secret registration information (secret vector) H in the database 330 and registers alternatively the update secret registration information (secret vector) $H_1$.

(Advantages of the First Embodiment)

According to the first embodiment, the secret data matching device 3 registers in the database 330 the first secret vector obtained by concealing the biometric data and the key based on a first random number and a first linear combination that uses the row vectors of the approximate determination matrix 331. The secret data matching device 3 obtains the second secret vector obtained by concealing the matching data based on a second random number and a second linear combination that uses the row vectors of the approximate determination matrix 331. The secret data matching device 3 then calculates the residue vector which is the residue obtained by applying the approximate determination matrix 331 as a modulus to the difference of the first secret vector and the second secret vector. The secret data matching device 3 determines whether the biometric data and the matching data are approximate based on the calculated residue vector and extracts the key from the residue vector when the biometric data and the matching data are approximate. The secret data matching device 3 adds the extracted key to the second secret vector obtained by concealing the matching data to create the third secret vector. The secret data matching device 3 registers the created third secret vector in the database 330. As a result, the secret data matching device 3 may update securely and easily the biometric data in the key binding method. That is, the secret data matching device 3 obtains the second secret vector in which the biometric data used during the matching is concealed and thus may obtain securely the biometric data. The secret data matching device 3 uses the obtained second secret vector and the previously registered key to create and register secret vector in which the biometric data used during the matching is newly concealed. As a result, the secret data matching device 3 may update securely and easily the biometric data of the user.

According to the first embodiment, the secret data matching device 3 erases the first secret vector and adds the third secret vector. As a result, the secret data matching device 3 may update easily the most recent biometric data of the user.

(Embodiment 2)

The previous discussion examined a case in which the secret data 332 stored as one set of data per user is updated to the secret data in which the matching data is concealed during matching in the secret data matching device 3 according to the first embodiment. However, the secret data matching device 3 is not limited in this way, and a plurality of sets of the secret data 332 may be stored per one user and more secret data in which the matching data is concealed during matching may be added.

A case will be discussed in which the secret data matching device 3 in a second embodiment adds more secret data in which the matching data is concealed during matching so as to store a plurality of sets of the secret data 332 per one user.

(Configuration of Secret Data Authentication System)

Figure 5:
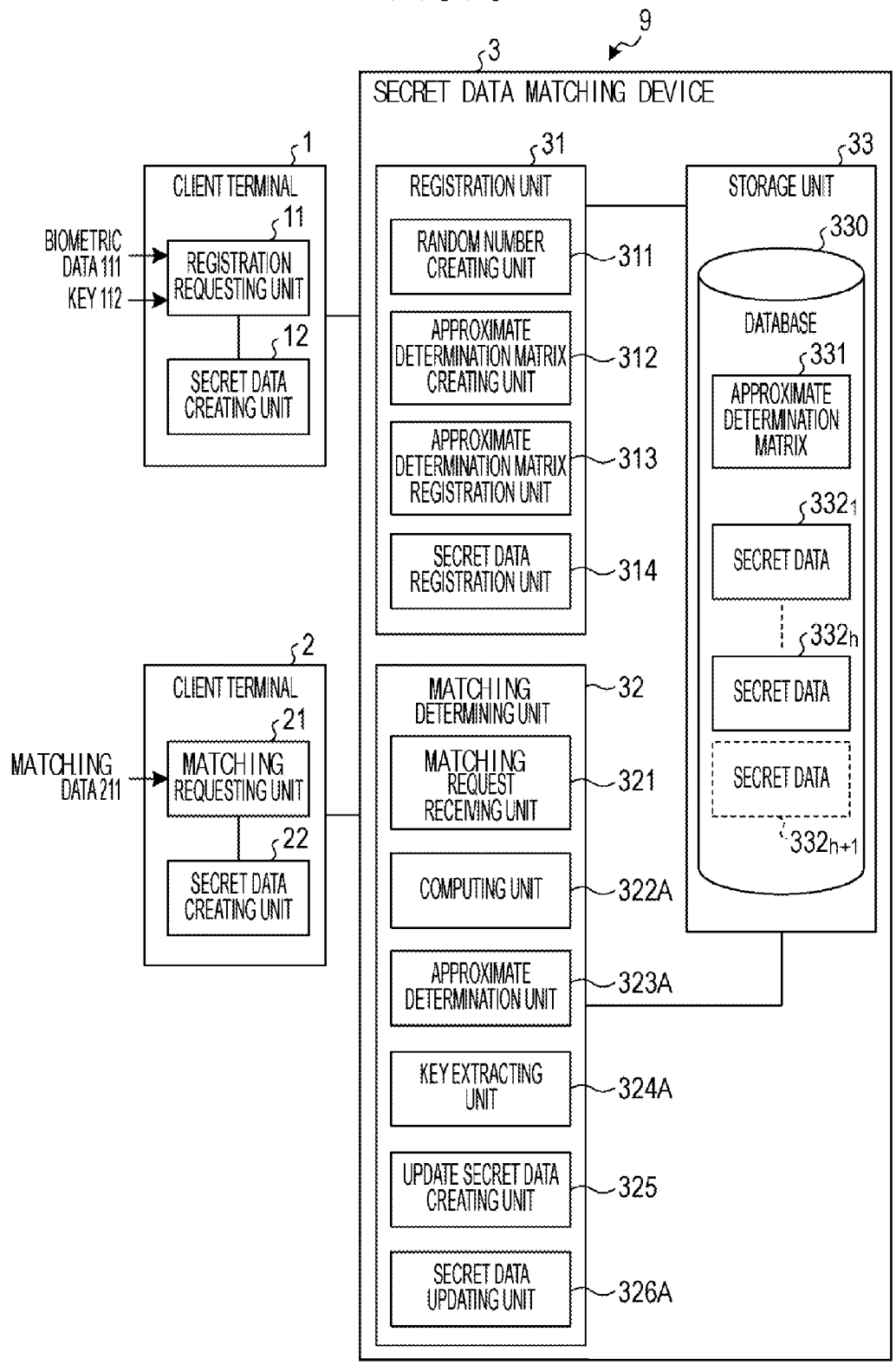
FIG. 5 is a view for explaining an example of a functional configuration of a secret data matching system according to a second embodiment.

FIG. 5 is a view for explaining an example of a functional configuration of a secret data matching system according to the second embodiment. Configurations similar to those of the secret data matching system 9 illustrated in FIG. 1 are illustrated with the same reference numerals, and explanations of duplicated configurations and operations will be omitted. The first and second embodiments differ from each other due to changes of a computing unit 322A, an approximate determination unit 323A, a key extracting unit 324A, and a secret data updating unit 326A. The first and second embodiments also differ due to the fact that a plurality of sets of secret data 332 is stored per one user. As an example, the secret data 332 is stored as h (where h is a natural number) number of sets per one user.

The computing unit 322A calculates h number of difference vectors indicating the difference between the plurality of sets of secret data $332_{1 \, to \, h}$ (secret vectors) registered in the database 330 and the secret data of the concealed matching data 211 received from the client terminal 2. The computing unit 322A then calculates, from the calculated h number of difference vectors, h number of residue vectors which indicate the residues when the approximate determination matrix 331 is used as the modulus. As an example, when the difference vector is $z_1$ and the approximate determination matrix 331 is V, the residue vectors are expressed as "$z_1$ mod V" with regard to the secret data $332_1$. The computing unit 322A outputs the calculated h number of residue vectors to the approximate determination unit 323A.

The approximate determination unit 323A determines whether the last components of the h number of residue vectors received from the computing unit 322A are "0". When any of the last components of the residue vectors are "0", the approximate determination unit 323A determines that the matching data 211 and the secret data$_{1 \, to \, h}$ 332 are approximate. When none of the last components of the residue vectors are "0", the approximate determination unit 323A determines that the matching data 211 and the secret data 332 are not approximate.

When the matching data 211 and the secret data 332 are determined to be approximate each other, the key extracting unit 324A extracts the (n+1)st components of the residue vectors determined as having "0" as the last component thereof as the key 112 unique to the user. The key extracting unit 324A then transmits the extracted key 112 to the client terminal 2 that has requested the matching. When the matching data 211 and the secret data 332 are determined not to be approximate each other, the key extracting unit 324A transmits the fact that the data are not approximate (the fact that the authentication failed) to the client terminal 2.

When the data is determined to be approximate, the update secret data creating unit 325 adds the key 112 extracted by the key extracting unit 324A to the secret data subject to the matching request to create update secret data.

The secret data updating unit 326A adds the update secret data created by the update secret data creating unit 325 with regard to the matching data 211 to the database 330. That is, the secret data updating unit 326A adds the update secret data in the database 330 as new secret data $332_{1+1}$.

(Sequence of Updating Processing for Secret Data)

Figure 6:
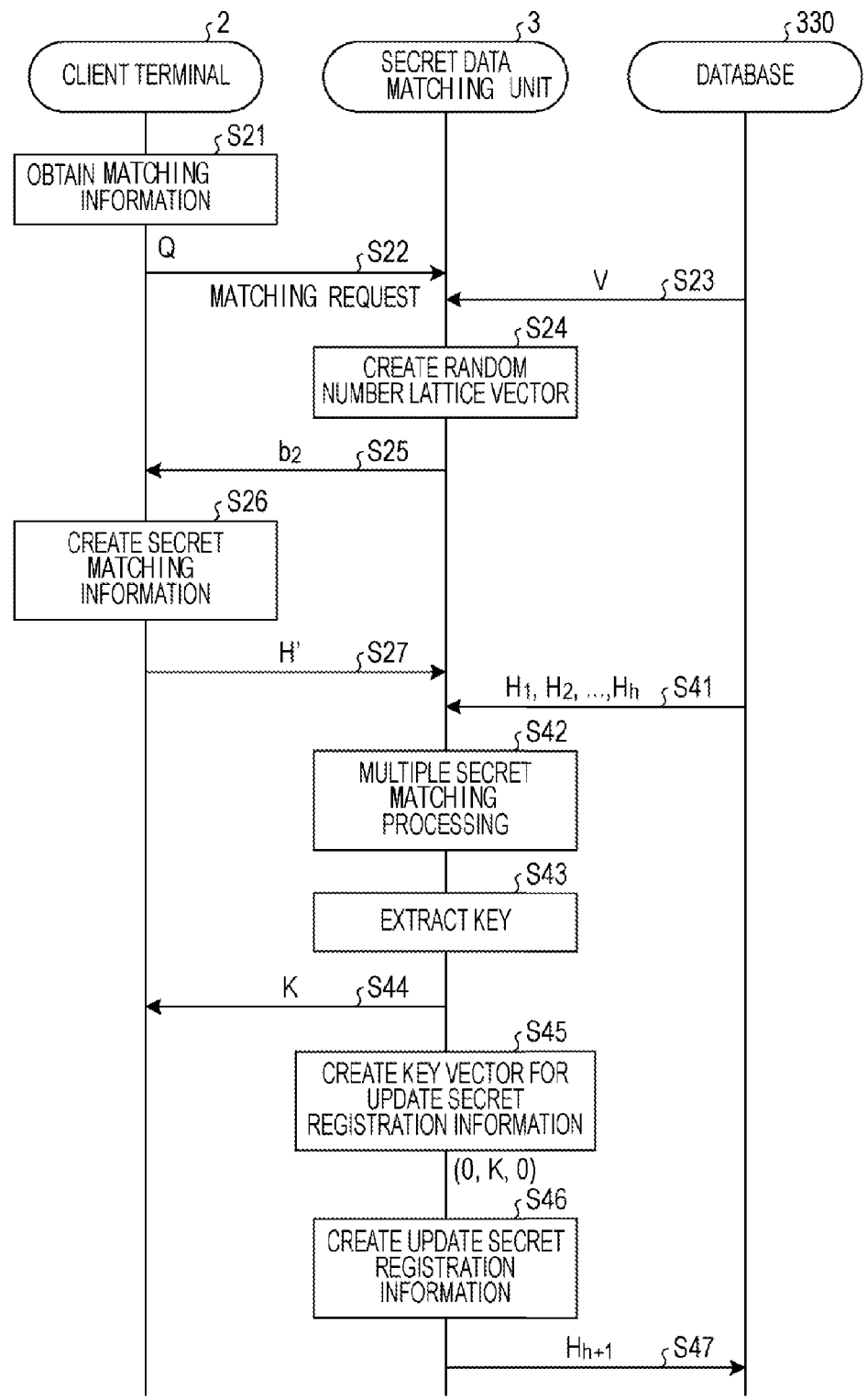
FIG. 6 illustrates a sequence of secret data updating processing according to the second embodiment.

Next, a sequence of the updating processing for the secret data will be explained with reference to FIG. 6. FIG. 6 illustrates a sequence of secret data updating processing according to the second embodiment. The matching data 211 of the client is represented as Q, the key 112 unique to the client is represented as K, the approximate determination matrix 331 is represented as V, and the secret vectors are represented as H', $H_{1\ to\ h,\ h+1}$ in FIG. 6.

The processing from when the client terminal 2 obtains the matching data Q as the matching information until the client terminal 2 creates the secret vector H' in which the matching data Q is concealed as the secret matching information and transmits the secret vector H' to the secret data matching device 3 (steps S21 to S27) is the same as the processing discussed with reference to FIG. 4. Therefore further explanation will be omitted.

The computing unit 322A in the secret data matching device 3 that receives the secret vector H' from the client terminal 2 obtains the secret vectors $H_1, H_2, \ldots H_h$ from the database 330 (step S41). The secret data matching device 3 receives user identification data (ID), which is a user identifier, and the secret vector H' from the client terminal 2. The computing unit 322A obtains the secret vectors $H_1, H_2, \ldots H_h$ corresponding to the user ID from the database 330.

The approximate determination unit 323A then uses the h number of residue vectors calculated from the difference between the secret vector H' for which matching is requested and the obtained secret vectors $H_{1\ to\ h}$ to perform the matching processing while the vectors are still concealed (step S42). The approximate determination unit 323A determines whether the last components of the h number of residue vectors are "0". When any of the last components of the residue vectors are "0", the approximate determination unit 323A determines that the matching data Q and the secret vectors $H_{1\ to\ h}$ are approximate. When none of the last components of the residue vectors are "0", the approximate determination unit 323A determines that the matching data Q and the secret vectors $H_{1\ to\ h}$ are not approximate.

When the data is determined to be approximate, the key extracting unit 324A extracts the key K unique to the user from any one of the residue vectors determined as having "0" as the last components thereof (step S43). The key extracting unit 324A then transmits the extracted key K to the client terminal 2 that requested the matching (step S44).

The update secret data creating unit 325 then creates the key vector for the update secret registration information from the key K extracted by the key extracting unit 324A (step S45). The update secret data creating unit 325 attaches n number of 0's and one 0 to the key K to create an expanded key vector (0, K, 0).

The update secret data creating unit 325 then creates the update secret registration information (step S46). The update secret data creating unit 325 adds the key vector (0, K, 0) and the secret vector H' subject to the matching request to create the update secret vector $H_{h+1}$ as the update secret registration information.

The secret data updating unit 326A transmits the update secret registration information created by the update secret data creating unit 325 to the database 330 (step S47). The secret data updating unit 326A adds the update secret registration information (secret vector) $H_{h+1}$ to the database 330 in addition to the secret registration information (secret vectors) $H_1, H_2, \ldots, H_h$.

(Advantages of the Second Embodiment)

According to the second embodiment, the secret data matching device 3 registers in the database 330 the first secret vector obtained by concealing the biometric data and the key based on a first random number and a first linear combination that uses the row vectors of the approximate determination matrix 331. The secret data matching device 3 obtains the second secret vector obtained by concealing the matching data based on a second random number and a second linear combination that uses the row vectors of the approximate determination matrix 331. The secret data matching device 3 then calculates the residue vector which is the residue obtained by applying the approximate determination matrix 331 as a modulus to the difference of the first secret vector and the second secret vector. The secret data matching device 3 determines whether the biometric data and the matching data are approximate based on the calculated residue vector and extracts the key from the residue vector when the biometric data and the matching data are approximate. The secret data matching device 3 adds the extracted key to the second secret vector obtained by concealing the matching data to create the third secret vector. The secret data matching device 3 further adds the created third secret vector to the database 330. As a result, the secret data matching device 3 may securely and easily add the biometric data using the key binding method. Consequently, the secret data matching device 3 may use a plurality of secret vectors to carry out the approximate determination and further improve the accuracy of the approximate determination because the secret vectors in which the biometric data is concealed are also added.

(Embodiment 3)

The previous discussion examined a case in which the secret data 332 stored as one set of data per user is updated to the secret data in which the matching data is concealed during matching in the secret data matching device 3 according to the first embodiment. However, the secret data matching device 3 is not limited in this way, and secret data obtained by combining a plurality of sets of biometric data (including matching data) may be stored per one user and secret data in which the matching data is concealed during matching may be combined and the combined secret data may be updated.

Accordingly, a case will be explained in which the secret data matching device 3 according to a third embodiment stores secret data obtained by combining a plurality of sets of secret data per one user, and then combines the secret data in which the matching data is concealed during matching and updates the combined secret data.

(Configuration of Secret Data Matching System)

Figure 7:
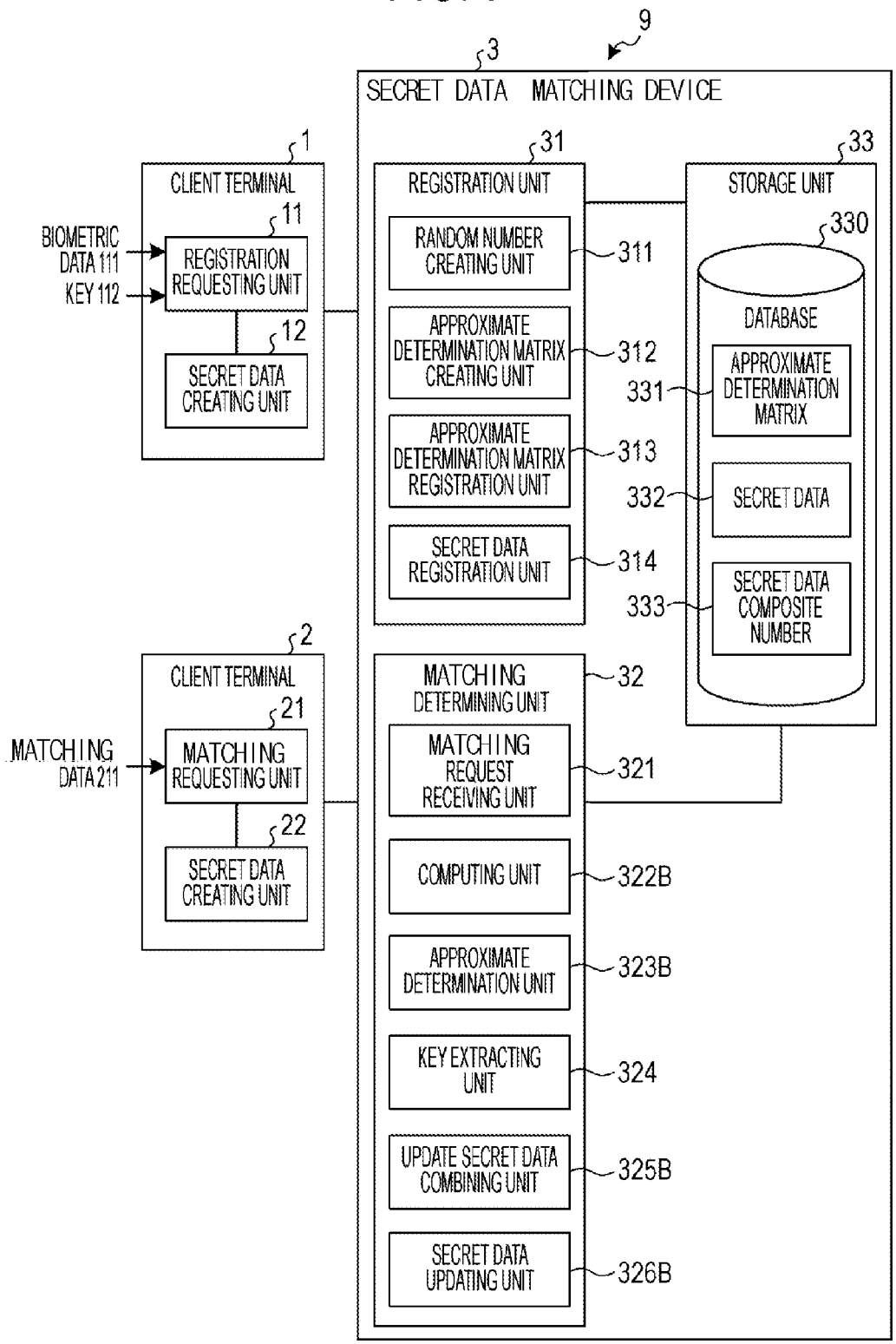
FIG. 7 is a view for explaining an example of a functional configuration of a secret data matching system according to a third embodiment.

FIG. 7 is a view for explaining an example of a functional configuration of a secret data matching system according to a third embodiment. Configurations similar to those of the secret data matching system 9 illustrated in FIG. 1 are illustrated with the same reference numerals, and explanations of duplicated configurations and operations will be omitted. The first embodiment and the third embodiment differ due to changes of a computing unit 322B, an approximate determination unit 323B, an update secret data combining unit 325B, and a secret data updating unit 326B. The first and third embodiments differ due to the addition of a secret data composite number 333 to the storage unit 33. The secret data 332 according to the third embodiment is secret data obtained by combining a plurality of sets of biometric data per one user. The secret data composite number 333 represents composite numbers of the biometric data.

The computing unit 322B reads out the secret data 332 (secret vector) and the secret data composite number 333 from the database 330. The computing unit 322B calculates a difference vector indicating the difference between the read secret data 332 (secret vector) and the secret data of the concealed matching data 211 received from the client terminal 2. The computing unit 322B calculates a difference vector $z_c$ indicating the difference between the secret data 332 (secret vector) and the secret data of the concealed matching data 211 received from the client terminal 2 using the following formula (7). Hc represents the secret vector indicating the secret data 332 and h represents the secret data composite number 333. H' is the secret vector indicating the secret data in which the matching data 211 is concealed.

$$z_c = Hc - h \times H' \qquad (7)$$

The h is multiplied by H' because Hc is the secret vector indicating the secret data in which h number of sets of the biometric data is combined.

The computing unit 322B then calculates a residue vector which is the residue obtained by applying the approximate determination matrix 331 as the modulus to the calculated difference vector. As an example, when the difference vector is $z_c$ and the approximate determination matrix 331 is V, the residue vector is expressed as "$z_c$ mod V". "$z_c$ mod V" is equivalent to $(z_c - [z_c \times V^{-1}] \times V)$. "$V^{-1}$" represents the inverse matrix of the matrix V. The computing unit 322B outputs the calculated residue vector to the approximate determination unit 323B.

When the last component of the residue vector is found to be "0" based on determination whether the last component of the residue vector received from the computing unit 322B is "0" or not, the approximate determination unit 323B determines that the combined biometric data and the matching data 211 are approximate. When the last component of the residue vector is not "0", the approximate determination unit 323B determines that the combined biometric data and the matching data 211 are not approximate.

When the combined biometric data and the matching data 211 are determined to be approximate, the key extracting unit 324 extracts the (n+1)st component of the residue vector as the key 112 unique to the user. The key extracting unit 324 then transmits the extracted key 112 to the client terminal that has requested the matching. When the combined biometric data and the matching data 211 are determined not to be approximate, the key extracting unit 324 transmits the fact that the data is not approximate (the fact that the authentication failed) to the client terminal 2.

When the data is determined as approximate, the update secret data combining unit 325B combines the secret data 332 and the secret data subject to the matching request to create the secret data for updating. As an example, the update secret data combining unit 325B adds the secret data 332 to the secret data in which the matching data 211 received from the client terminal 2 is concealed, to create the update secret data, as indicated by the following formula (8). H'c represents a secret vector indicating the update secret data. H' is the secret vector indicating the secret data in which the matching data 211 is concealed. Hc is the secret vector indicating the secret data 332.

$$H'c = H' + Hc \qquad (8)$$

The secret data updating unit 326B stores the update secret data created by the update secret data combining unit 325B in the database 330. That is, the secret data updating unit 326B registers the update secret data in the database 330 in place of the secret data 332. The secret data updating unit 326B increments the number of the secret data composite number 333 by one.

The combining of the secret data executed by the matching determining unit 32 will be explained next. The secret data matching device 3 has the secret vector H' (=(Q, 0, 0)+$r_2 \times b_2$, see formula (2)), in which the n-dimensional matching data Q is concealed and the secret data 332. It is assumed that the contents of the secret vector Hc which indicates the secret data 332 are indicated by formula (9). That is, Hc is a secret vector in which the secret data having h number of sets of the biometric data concealed therein is combined. T1 to Th are vectors indicating the respective biometric data. K is the key unique to the client. b' is the lattice element.

$$Hc = (T1 + T2 + \ldots Th, K, 0) + b' \qquad (9)$$

Substituting the formula (9) and the formula (2) into formula (7), the difference vector $z_c$ calculated by the computing unit 322B is expressed by formula (10).

$$z_c = (T1 + T2 + \ldots Th - h \times Q, K, 0) + b' - h \times r_2 \times b_2 \qquad (10)$$

The computing unit 322B establishes the difference vector of the difference between the totaled vectors indicating the h number of sets of biometric data and the vectors indicating the matching data multiplied h times, and thus enables the approximate determination unit 323B to carry out the approximate determination in the same way as when the vectors are not combined (see formula (3)). Because b'−h×$r_2 \times b_2$ corresponds to any intersection on the lattice, b'−h×$r_2 \times b_2$ is ignored when the residue vector of the approximate determination matrix V from the difference vector $z_c$ is calculated.

The update secret vector H'c is expressed by formula (11) when the contents of H' and the contents of Hc are substituted into formula (8).

$$H'c = (T1 + T2 + \ldots Th + Q, K, 0) + r_2 \times b_2 + b' \qquad (11)$$

Therefore, the update secret vector H'c becomes the secret vector which is a combination of the h+1 number of sets of the biometric data in which the matching data Q is added to the h number of sets of registered biometric data. The secret data updating unit 326B registers the update secret vector H'c as the new secret data 332 whereby the secret data 332 may be updated.

(Sequence of Updating Processing for Secret Data)

Figure 8:
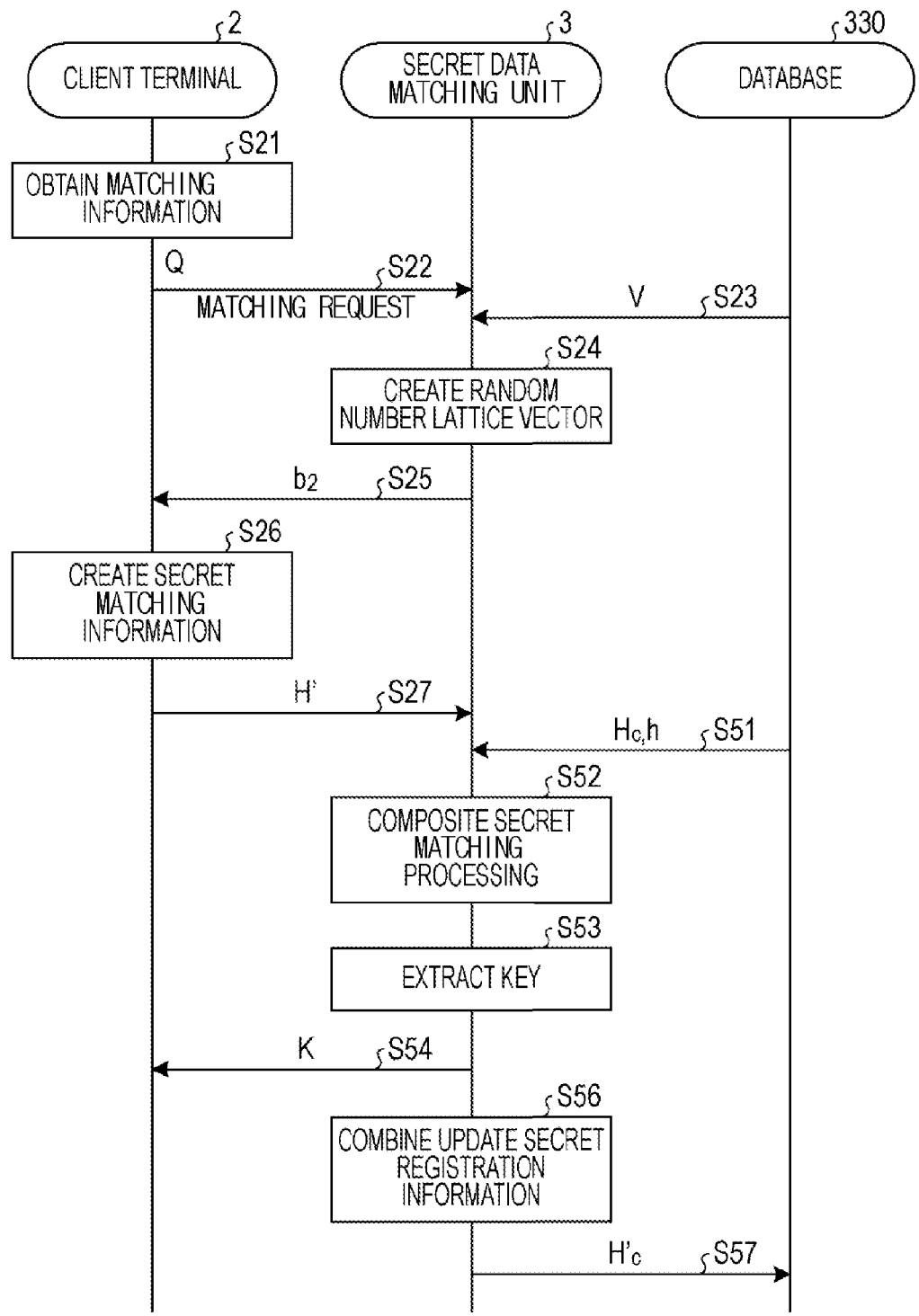
FIG. 8 illustrates a sequence of secret data updating processing according to the third embodiment.

Next, a sequence of the updating processing for the secret data will be explained with reference to FIG. 8. FIG. 8 illustrates a sequence of secret data updating processing according to the third embodiment. The matching data 211 of the client is represented as Q, the key 112 unique to the client is represented as K, the approximate determination matrix 331 is represented as V, and the secret vectors are represented as H' and Hc in FIG. 8. The secret data composite number 333 registered in the database 330 is represented as h.

The processing from when the client terminal 2 obtains the matching data Q as the matching information until the client terminal 2 creates the secret vector H' in which the matching data Q is concealed as the secret matching information and transmits the secret vector H' to the secret data matching device 3 (steps S21 to S27) is the same as the processing discussed with reference to FIG. 4. Therefore further explanation will be omitted.

The computing unit 322B in the secret data matching device 3 that receives the secret vector H' from the client terminal 2 obtains the secret vector Hc and "h" which represents the secret data composite number 333 from the database 330 (step S51). The secret data matching device 3 receives user identification data (ID), which is a user identifier, and the secret vector H' from the client terminal 2. The computing unit 322B obtains the secret vector Hc corresponding to the user ID and the "h" which indicates the secret data composite number 333 from the database 330.

The approximate determination unit 323B then uses the residue vector calculated from the difference vector of the secret vector H' for which matching is requested and the obtained secret vector Hc to perform the matching processing while the vectors are still concealed (step S52). The approximate determination unit 323B determines whether the last component of the residue vector is "0". When the last component of the residue vector is "0", the approximate determination unit 323B determines that the combined biometric data and the matching data Q are approximate. When the last component of the residue vector is not "0", the approximate determination unit 323B determines that the combined biometric data and the matching data Q are not approximate.

When the data is determined to be approximate, the key extracting unit 324 extracts the key K unique to the user from the residue vector (step S53). The key extracting unit 324 then transmits the extracted key K to the client terminal 2 that requested the matching (step S54).

The update secret data combining unit 325B then creates the update secret registration information (step S56). The update secret data combining unit 325B uses formula (8) to add the secret vector Hc read from the database 330 and the secret vector H' subject to the matching request to create the update secret vector Hc' as the update secret registration information.

The secret data updating unit 326B then transmits the update secret registration information created by the update secret data combining unit 325B to the database 330 (step S57). The secret data updating unit 326B discards the secret registration information (secret vector) Hc held in the database 330 and registers alternatively the update secret registration information (secret vector) H'c. The secret data updating unit 326B increments the secret data composite number 333 to h+1.

(Advantages of the Third Embodiment)

According to the third embodiment, the secret data matching device 3 carries out the following processing when the combined biometric data and the matching data 211 are determined to be approximate. That is, the secret data matching device 3 combines the secret data 332 in which the combined biometric data and the matching data 211 subject to the matching request, to create the update secret data. The secret data matching device 3 adds the created update secret data to the database 330 and erases the secret data 332. According to this configuration, the secret data matching device 3 registers the update secret data obtained by combining the secret data 332 and the secret data in which the matching data 211 is concealed, in place of the previously registered secret data 332, and thus the biometric data may be updated securely and easily. As a result, the secret data matching device 3 holds the combined data of the plurality of sets of matching data that had been successfully updated in the past as the secret data, and the secret data matching device 3 may bring improvement in accuracy similar to the improved approximate determination carried out by the matching of one set of the secret data.

(Other)

When it is determined that the biometric data 111 from the registration and the matching data 211 are approximate in the embodiments, the key extracting unit 324 in the secret data matching device 3 extracts the key 112 unique to the user from the residue vector and transmits the key 112 to the client terminal 2. The update secret data creating unit 325 is described as adding the extracted key 112 to the secret data subject to the matching request to create the update secret data. However, the update secret data creating unit 325 may switch to the processing to create the update secret data at a predetermined timing. The predetermined timing, for example, may be a timing after a fixed period has passed or when a decrease in the level of similarity is detected. As an example, the update secret data creating unit 325 determines whether the predetermined timing has been detected when the data is determined as approximate. When the predetermined timing is detected, the update secret data creating unit 325 adds the key 112 extracted by the key extracting unit 324 to the secret data subject to the matching request to create secret data for updating. The secret data for updating corresponds to the template to be protected in the key binding method. As a result, the secret data matching device 3 is able to further inhibit a decrease over time in the level of similarity between the biometric information obtained during matching and the registered template.

Figure 9:
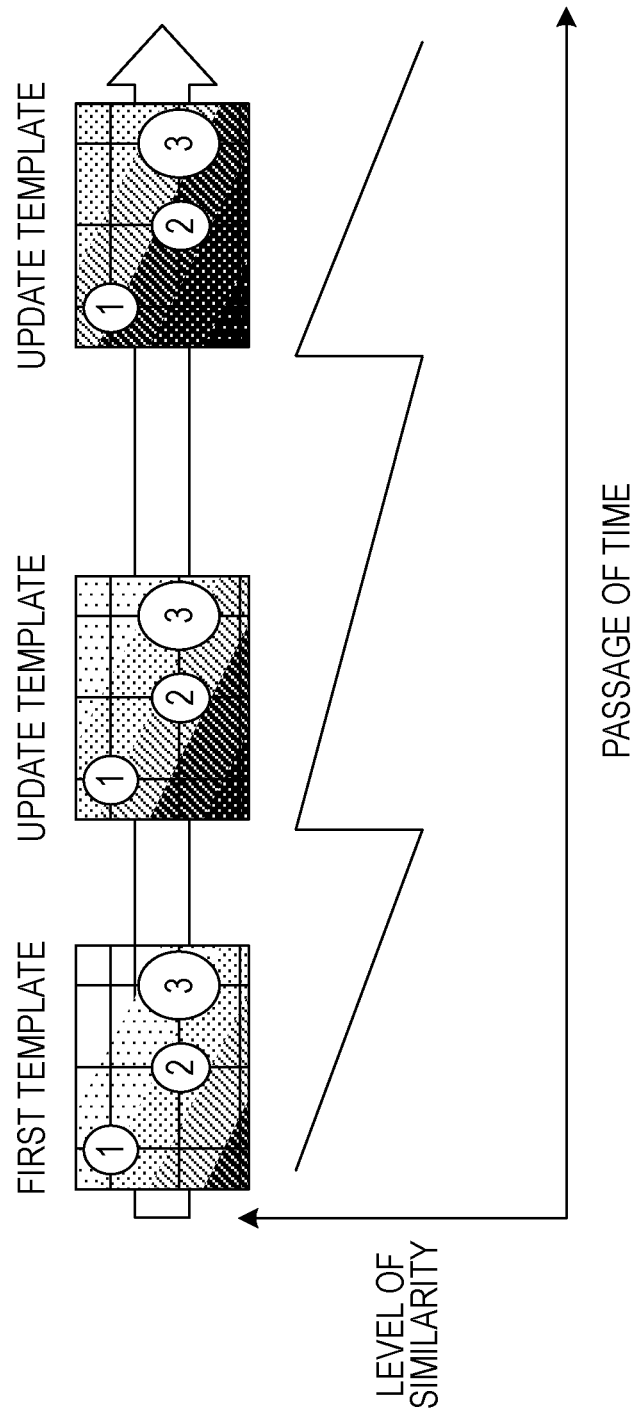
FIG. 9 illustrates an effect of template updating.

FIG. 9 illustrates the advantage of template updating. The positions on apparatuses for obtaining specific biometric information (e.g., fingerprints) to be used in the biometric authentication are represented by the numbers 1, 2, and 3. A decrease in the level of similarity between the obtained specific biometric information and the initially registered template is represented along with the passage of time. This occurs due to long-term changes of the biometric information itself or due to operation habituation by the user on the apparatuses for obtaining the biometric information. When the decrease in the level of similarity is detected, the secret data matching device 3 updates the initially registered template to a new template. While the level of similarity between the obtained specific biometric information and the new template increases, the level of similarity will decrease along with the passage of time. Thus, when a decrease in the level of similarity is detected, the secret data matching device 3 is able to inhibit a reduction in the level of similarity by updating the new template to an even newer template.

The secret data matching device 3 has been explained in the embodiments as determining whether the biometric data 111 from the registration and the matching data 211 are approximate by determining whether the last component of the residue vector created during the matching is "0". However, the secret data matching device 3 is not limited to the explained determination. The secret data matching device 3 may also determine whether the biometric data 111 from the registration and the matching data 211 are approximate by determining whether a plurality of components of the residue vector is "0".

For example, when the biometric data subject to the determination is information having n number of components, that is, when the biometric data 111 is information of the n-dimension, the approximate determination matrix creating unit 312 creates a diagonal matrix of n×n. The approximate determination matrix creating unit 312 then attaches a row vector as a (n+1)st row vector, of which each component is "0", to the n×n diagonal matrix. The approximate determination matrix creating unit 312 attaches a column vector formed by combining an n-dimensional random number vector and the key 112 threshold, to the (n+1)st column. The approximate determination matrix creating unit 312 then attaches a row vector as a (n+2)nd row vector, of which each component is "0", to the created (n+1)×(n+1) matrix. The approximate determination matrix creating unit 312 creates the matrix (n+2)×(n+2) in which the n+2-dimensional random number vector is attached to the (n+2)th column.

The approximate determination matrix creating unit 312 then attaches a row vector as a (n+3)rd row vector, of which each component is "0", to the (n+2)×(n+2) matrix. The approximate determination matrix creating unit 312 may create the approximate determination matrix 331 of (n+3)×(n+3) in which the (n+3)-dimensional random number vector is attached to the (n+3)th column.

As a result, the secret data matching device 3 calculates the (n+3)-dimensional residue vector using the approximate determination matrix 331 as the modulus by carrying out the same processing as in the embodiments. The secret data matching device 3 is able to carry out the approximate determination by determining whether all of the components from the (n+2)nd dimension to the (n+3)rd dimension of the residue vector are "0". As a result, the secret data matching device 3 is able to improve the accuracy of the approximate determination. Similarly, the approximate determination matrix creating unit 312 is able to further improve the accuracy of the approximate determination by creating the approximate determination matrix 331 of (n+m)×(n+m) (where m is a natural number larger than 3).

The secret data matching device 3 may also combine as appropriate the methods described in the first to third embodiments. For example, the secret data matching device 3 may substitute the secret data created by the update secret data creating unit 325 with any of the secret data among the held plurality of sets of the secret data $332_{1\ to\ h}$ while holding the plurality of sets of the secret data $332_{1\ to\ h}$ according to the second embodiment. The secret data matching device 3 may hold both the combined secret data 332 according to the third embodiment and the uncombined secret data 332 according to the first embodiment and use either one or both for identification as appropriate.

The secret data matching device 3 in the embodiments is described as using approximate determination of the biometric data 111. However, the secret data matching device 3 is not limited in this way and may use secret similarity determination between confidential documents. For example, the client terminal 1 extracts text or a document portion having characteristics from the confidential document and creates a feature quantity vector indicating the feature quantity of the extracted portion. The client terminal 1 then creates the secret vector in which the created feature quantity vector and a key are concealed and registers the secret vector in the database 330 of the secret data matching device 3 by carrying out the same processing as in the embodiments. The secret data matching device 3 may authenticate the registered secret vector and the secret vector to be authenticated in which the feature quantity vector created by the client terminal 2 is concealed, by carrying out the same processing as in the embodiments.

The secret data matching device 3 may be realized by installing the functions such as the abovementioned registration unit 31 and the matching determining unit 32 in an information processor apparatus such as a conventional personal computer or workstation.

The constituent elements of the illustrated parts do not have to be configured physically as illustrated. In other words, the embodiments are not limited to the particular forms of distribution and integration of each part and all or some of the parts may be configured to be functionally or physically distributed or integrated in arbitrary units according to the type of load or usage conditions and the like. For example, the random number creating unit 311 and the approximate determination matrix creating unit 312 may be integrated as one unit. Conversely, the approximate determination matrix creating unit 312 may be distributed among a first setting unit for setting the threshold indicating the approximation range and the key threshold in the matrix, and a second setting unit for setting the random numbers. The database 330 may be connected as an external device to the secret data matching device 3 and may be connected over a network.

Figure 10:
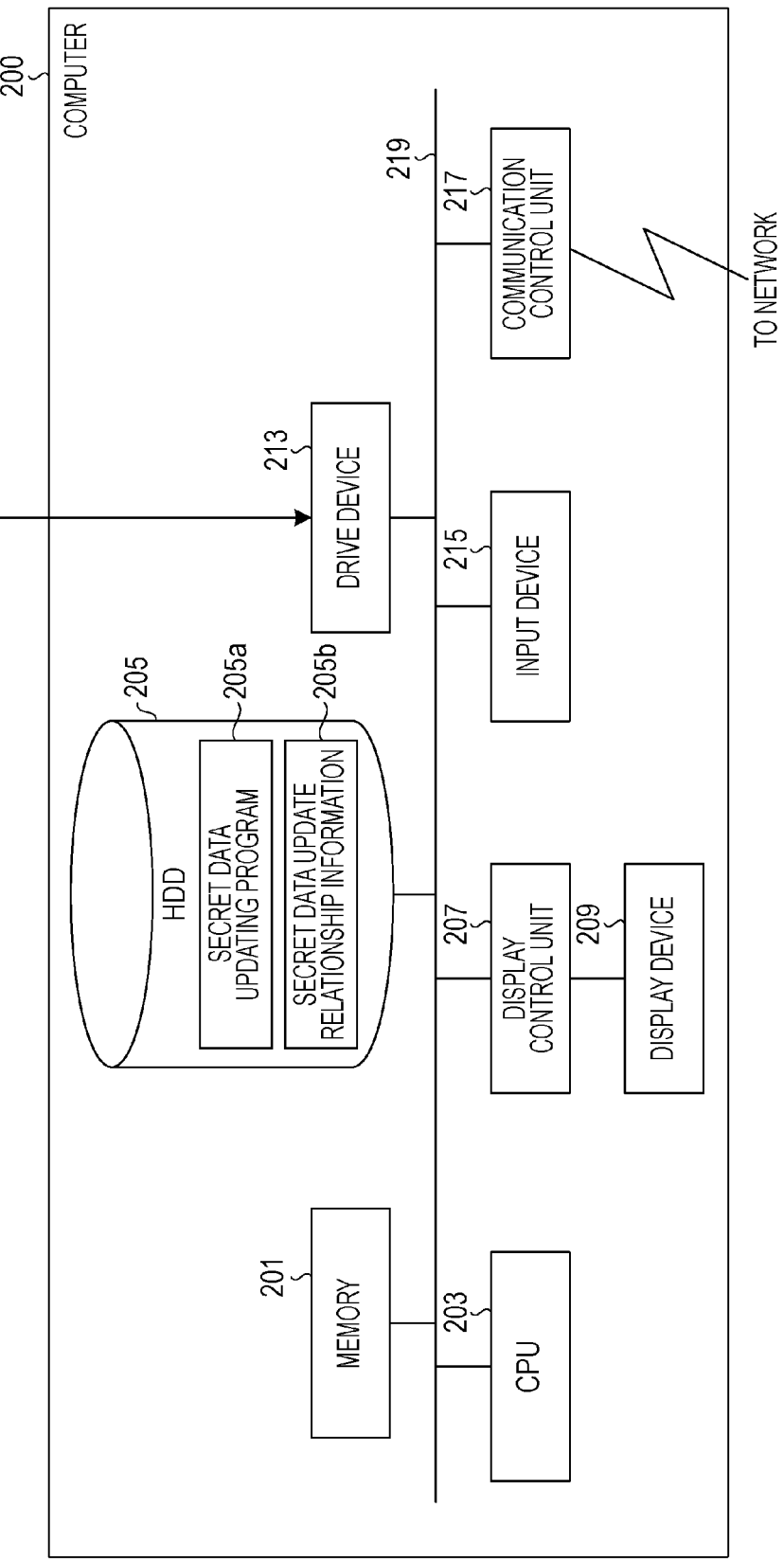
FIG. 10 illustrates an example of a computer for executing a secret data updating program.

The processing of the various functions described in the embodiments may be realized by executing a program prepared in advance using a computer such as a personal computer or a workstation. An example of a computer for executing a secret data updating program for realizing the same functions as the secret data matching device 3 illustrated in FIG. 1 will be explained below. FIG. 10 illustrates an example of a computer for executing a secret data updating program.

As illustrated in FIG. 10, a computer 200 includes a CPU 203 for executing various arithmetic operations, an input device 215 for receiving inputs of data from a user, and a display control unit 207 for controlling a display device 209. The computer 200 includes a drive device 213 for reading programs and the like from a storage medium, and a communication control unit 217 for transferring data with another computer over a network. The computer 200 includes a memory 201 for temporarily storing various types of information, and a HDD 205. The memory 201, the CPU 203, the HDD 205, the display control unit 207, the drive device 213, the input device 215, and the communication control unit 217 are connected by a bus 219.

The drive device 213 is a device for a removable disk 210 for example. The HDD 205 stores a secret data updating program 205a and secret data update relationship information 205b.

The CPU 203 reads the secret data updating program 205a and expands and executes the secret data updating program 205a in the memory 201 as processes. The processes correspond to the various functions of the secret data matching device 3. The secret data update relationship information 205b corresponds to the approximate determination matrix 331 and the secret data 332. The removable disk 201 for example stores various types of information such as the secret data updating program 205a.

The secret data updating program 205a is not necessarily stored in the HDD 205 from the start. For example, the program may be stored on a "portable physical medium" such as a flexible disk (FD), a CD-ROM, a DVD disk, a magneto-optical disc, an IC card and the like inserted into the computer 200. The computer 200 then may read the secret data updating program 205a from the medium to execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A secret data matching device comprising:
   a database;
   memory; and
   a processor coupled to the memory and configured to:
   store, in the database, a first secret vector obtained by concealing a first data set and a key data using a first linear combination and a first random number, the first linear combination being composed of row vectors in a determination matrix which is generated by attaching a random number vector as a last column to a matrix, the matrix including diagonal elements of a threshold for determining whether two sets of data are approximate and a threshold related to the key data;
   obtain a second secret vector by concealing a second data set using a second linear combination of the row vectors of the determination matrix and a second random number;
   calculate a residue vector which is a residue when the determination matrix is a modulus, from a difference between the first secret vector and the second secret vector;
   determine whether the first data set and the second data set are approximate based on the residue vector;
   extract the key data from the residue vector when the first data set and the second data set are determined as approximate;
   generate a third secret vector by combining the extracted key data and the second secret vector; and
   store the third secret vector in the database to replace the first secret vector to securely update the first data set.

2. The secret data matching device according to claim 1, wherein the processor is further configured to add the third secret vector and delete the first secret vector.

3. The secret data matching device according to claim 1, wherein the processor is further configured to add the third secret vector.

4. The secret data matching device according to claim 1, wherein the processor is further configured to generate a fourth secret vector by adding the first secret vector and the second secret vector when the first data set and the second data set are determined as approximate; and
   add the generated fourth secret vector and erase the first secret vector.

5. The secret data matching device according to claim 1, wherein the processor is further configured to generate the third secret vector by adding the key data and the second secret vector at a predetermined timing.

6. A non-transitory computer-readable recording medium having stored therein a program for causing a computer to execute a process for updating secret data, the process comprising:
   registering, in a database, a first secret vector obtained by concealing a first data set and a key data using a first linear combination and a first random number, the first linear combination being composed of row vectors in a determination matrix which is generated by attaching a random number vector as a last column to a matrix, the matrix including diagonal elements of a threshold for determining whether two sets of data are approximate and a threshold related to the key data;
   obtaining a second secret vector by concealing a second data set using a second linear combination of the row vectors of the determination matrix and a second random number;
   calculating a residue vector which is a residue when the determination matrix is a modulus, from a difference between the first secret vector and the second secret vector;
   determining whether the first data set and the second data set are approximate based on the residue vector;
   extracting the key data from the residue vector when the first data set and the second data set are determined as approximate as a result of the determination in the determining;
   generating a third secret vector by combining the extracted key data extracted by the extracting and the second secret vector obtained by the obtaining; and
   storing the third secret vector in the database to replace the first secret vector to securely update the first data set.

7. A secret data updating method, comprising:
   a computer having a database and that executes the processes of:
   registering, in the database, a first secret vector obtained by concealing a first data set and a key data using a first linear combination and a first random number, the first linear combination being composed of row vectors in a determination matrix which is generated by attaching a random number vector as a last column to a matrix, the matrix including diagonal elements of a threshold for determining whether two sets of data are approximate and a threshold related to the key data;
   obtaining a second secret vector by concealing a second data set using a second linear combination of the row vectors of the determination matrix and a second random number;
   calculating a residue vector which is a residue when the determination matrix is a modulus, from a difference between the first secret vector and the second secret vector;
   determining whether the first data set and the second data set are approximate based on the residue vector;
   extracting the key data from the residue vector when the first data set and the second data set are determined as approximate as a result of the determination in the determining;
   generating a third secret vector by combining the extracted key data extracted by the extracting and the second secret vector obtained by the obtaining; and
   storing the third secret vector in the database to replace the first secret vector to securely update the first data set.

* * * * *